(12) United States Patent
Masui

(10) Patent No.: US 7,073,807 B2
(45) Date of Patent: Jul. 11, 2006

(54) BICYCLE SUSPENSION FORK ASSEMBLY

(75) Inventor: Takuji Masui, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/175,502

(22) Filed: Jul. 7, 2005

(65) Prior Publication Data

US 2006/0103107 A1 May 18, 2006

(30) Foreign Application Priority Data

Nov. 16, 2004 (JP) .............................. 2004-331679

(51) Int. Cl.
*B62J 11/00* (2006.01)
*B62J 15/02* (2006.01)

(52) U.S. Cl. ................. 280/276; 280/288.4; 280/152.3; 280/852; 224/447

(58) Field of Classification Search ........... 280/152.05, 280/152.1–152.3, 276, 288.4, 851, 852, 854, 280/154, 847, 283, 279, 304.3; 362/473–476; 224/447

See application file for complete search history.

(56) References Cited

U.S. PATENT DOCUMENTS

| 5,165,712 A * | 11/1992 | Fuller ........................ 280/277 |
| 5,186,274 A * | 2/1993 | Hegman ..................... 180/227 |
| 5,355,746 A * | 10/1994 | Lin ............................. 224/420 |
| 5,855,388 A * | 1/1999 | Brewer ..................... 280/288.4 |
| 6,029,988 A * | 2/2000 | Edwards .................. 280/152.2 |
| 6,217,048 B1 * | 4/2001 | Saiki et al. .............. 280/152.1 |
| 6,557,876 B1 * | 5/2003 | Saiki et al. .............. 280/152.1 |
| 6,634,664 B1 * | 10/2003 | Kojima ..................... 280/288.4 |
| 6,974,144 B1 * | 12/2005 | Horiuchi ..................... 280/276 |
| 2005/0083703 A1 * | 4/2005 | Nakayama et al. ......... 362/473 |

FOREIGN PATENT DOCUMENTS

DE 20106105 U1 6/2001
JP 2002-193166 A 7/2002

* cited by examiner

*Primary Examiner*—Lesley D. Morris
*Assistant Examiner*—Matthew Luby
(74) *Attorney, Agent, or Firm*—Global IP Counselors, LLP (57) ABSTRACT

A suspension fork assembly is mounted to the front part of a bicycle frame and includes a fork column, a fork shoulder unit, a pair of suspension assemblies, a connector and a lamp mounting unit. The fork column is rotatably mounted to the front part of the frame. The fork shoulder unit is secured at the center thereof to the bottom end of the fork column and extends laterally there from in either direction. Each suspension assembly is secured to a respective end of the fork shoulder unit. The shaft of the front wheel is mounted to the bottom ends of the suspension assemblies. The connector has an arch-like configuration and connects and reinforces the suspension assemblies while avoiding contact with the front wheel. The lamp mounting unit is disposed on a top surface of the connector and a front lamp can be mounted thereto.

14 Claims, 7 Drawing Sheets

BICYCLE SUSPENSION FORK ASSEMBLY

CROSS-REFERENCE TO RELATED APPLICATIONS

This application claims priority to Japanese Patent Application No. 2004-331679. The entire disclosure of Japanese Patent Application No. 2004-331679 is hereby incorporated herein by reference.

BACKGROUND OF THE INVENTION

1. Field of the Invention

This invention generally relates to a bicycle suspension fork assembly. More specifically, the present invention relates to a bicycle suspension fork assembly that is mounted to the front part of the frame of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle suspension fork.

Suspension forks are widely used in bicycle front forks in recent years. When the bicycle travels on a path having rough surfaces, the suspension fork prevents vibrations from being transmitted to the rider thereby enabling a comfortable ride. A mud guard and an illumination device, such as a front lamp, may be mounted to the front fork. However, because a suspension fork does not have dedicated mounting units the mounting of devices such as a mud guard or illumination device is difficult.

Accordingly, a suspension fork to which a mud guard and an illumination device can be easily mounted has been developed (Japanese Patent Laid-Open Publication No. 2002-193166). The conventional suspension fork to which a mud guard and an illumination device can be easily mounted includes a fork column that is rotatably mounted to the head tube in the front part of the frame, a fork shoulder unit, a pair of suspension assemblies and a horseshoe-shaped connector called a 'brace' that connects the suspension assemblies. The fork shoulder unit extends laterally in either direction from the center of the bottom end of the fork column, and the top end of each suspension assembly is secured to either end of the shoulder unit. The front wheel is rotatably mounted to the bottom ends of the suspension assemblies. Each suspension assembly has a cylinder and a rod that moves forward and backward relative to the cylinder. Upright-type suspension assemblies in which the rods are mounted to the fork shoulder unit and the front wheel is mounted to the cylinders are generally used. The connector is formed in an arch shape and connects and reinforces the suspension assemblies while avoiding contact with the wheel. The connector is integrally formed with the cylinders. In the conventional suspension fork, separate members comprising multi-purpose mounting members are mounted to the connector in order to enable mounting of a mud guard and an illumination device.

In the conventional suspension fork, multi-purpose mounting members are mounted to the connector. As a result, component parts that are mounted around the suspension fork, such as a front lamp and a mud guard, can be efficiently mounted. However, because multi-purpose mounting members are used, the number of component parts increase, leading to an increase in weight. In addition, because multi-purpose mounting members must be mounted, the mounting of the mud guard or illumination device is a cumbersome operation.

In view of the above, it will be apparent to those skilled in the art from this disclosure that there exists a need for an improved bicycle suspension fork assembly that is light weight and easily mounted. This invention addresses this need in the art as well as other needs, which will become apparent to those skilled in the art from this disclosure.

SUMMARY OF THE INVENTION

An object of the present invention is to enable mounting of an illumination device on a bicycle suspension fork assembly without an increase in the number of component parts.

In accordance with a first aspect of the present invention, a bicycle suspension fork assembly is provided that includes a fork column, a fork shoulder unit, first and second suspension assemblies, a connector and an illumination device mounting unit. The fork column is configured and arranged to be rotatably mounted to a front part of a frame of a bicycle. The fork shoulder unit has a center portion with a bottom end of the fork column secured thereto and has first and second arms extending laterally in opposite directions from the center portion. The first and second suspension assemblies are secured to end portions of the first and second arms of the fork shoulder unit, respectively. The arch shaped connector is configured and dimensioned to connect the first and second suspension assemblies. The illumination device mounting unit is disposed on a top surface of the connector for mounting an illumination device. The illumination device mounting unit has a concave mounting area across a cross-sectional width of the illumination device mounting unit.

With this suspension fork assembly, when it is mounted to the frame, an illumination device can be directly mounted to the connector because an illumination device mounting unit is disposed on the top surface of the connector. As a result, an illumination device can be mounted to the suspension fork assembly without using an extra component part such as a multi-purpose mounting member. Here, because an illumination device mounting unit is disposed on the connector of the suspension fork assembly, an illumination device is mounted without an increase in the number of component parts. Furthermore, because the purpose of the connector is to connect and reinforce the suspension assemblies as described above, the connector is formed to have a relatively high rigidity. Therefore, the construction in which an illumination device is directly mounted to the connector has a high rigidity and thereby ensures that the optical axis of the illumination device is not easily affected by the vibrations that occur during the travel of the bicycle.

The bicycle suspension fork assembly pertaining to a second aspect of the present invention comprises the bicycle suspension fork assembly according to the first aspect of the present invention, wherein the suspension assemblies each have a rod that is secured to the fork shoulder unit and a cylinder in which the rod is housed such that it can move axially therein. The wheel axle is mounted to the bottom end of the cylinder and the connector connects the cylinders in front of the rods. Since a connector is essential in an upright type suspension fork with rods mounted to a fork shoulder unit in order to reinforce the cylinders, such a connector is disposed in front of the rods. A front lamp comprising an illumination device that provides forward illumination can be easily mounted without an increase in the number of component parts on the connector disposed in front of the rods.

The bicycle suspension fork assembly pertaining to a third aspect of the present invention comprises the bicycle suspension fork assembly according to the second aspect of the present invention, wherein the connector is integrally formed with the cylinders. In this case, because the connector is integrally formed with the cylinders, the rigidity of the suspension increases.

The bicycle suspension fork assembly pertaining to a fourth aspect of the present invention comprises the bicycle suspension fork assembly according to any of the first through third aspects of the present invention, wherein the illumination device mounting unit has a concave mounting area that forms a depression in the connector.

The bicycle suspension fork assembly pertaining to a fifth aspect of the present invention comprises the bicycle suspension fork assembly according to the fourth aspect of the present invention, wherein the concave mounting area has an arc-shaped curved surface to which an illumination device can be mounted such that it can move around the lateral axis thereof. In this case, the optical axis of the illumination device mounted to the illumination device mounting unit can be adjusted up and down.

The bicycle suspension fork assembly pertaining to a sixth aspect of the present invention comprises the bicycle suspension fork assembly according to the fourth aspect of the present invention, wherein the concave mounting area has a hemispherical recess to which an illumination device can be mounted such that it can move around the lateral and vertical axes thereof. In this case, the optical axis of the illumination device mounted to the illumination device mounting unit can be adjusted not only vertically but also horizontally.

The bicycle suspension fork assembly pertaining to a seventh aspect of the present invention comprises the bicycle suspension fork assembly according to any of the first through sixth aspects of the present invention, wherein the suspension fork assembly further includes a mud guard mounting unit that is disposed on the bottom surface of the connector that faces the illumination device mounting unit. In this case, an illumination device and a mud guard can be mounted simultaneously, which facilitates the mounting of such component parts. In addition, because even if the suspension fork assembly moves up and down, the mud guard similarly moves up and down together with the connector. The distance between the mud guard and the wheel stays constant at all times and the splashing of muddy water or the like can be more effectively controlled.

According to the present invention, because an illumination device mounting unit is disposed on the connector, an illumination device can be mounted without an increase in the number of component parts. Furthermore, because an illumination device can be directly mounted on the connector, which has a relatively high rigidity, the optical axis of the illumination device is not easily affected by vibrations that occur when the bicycle is ridden.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
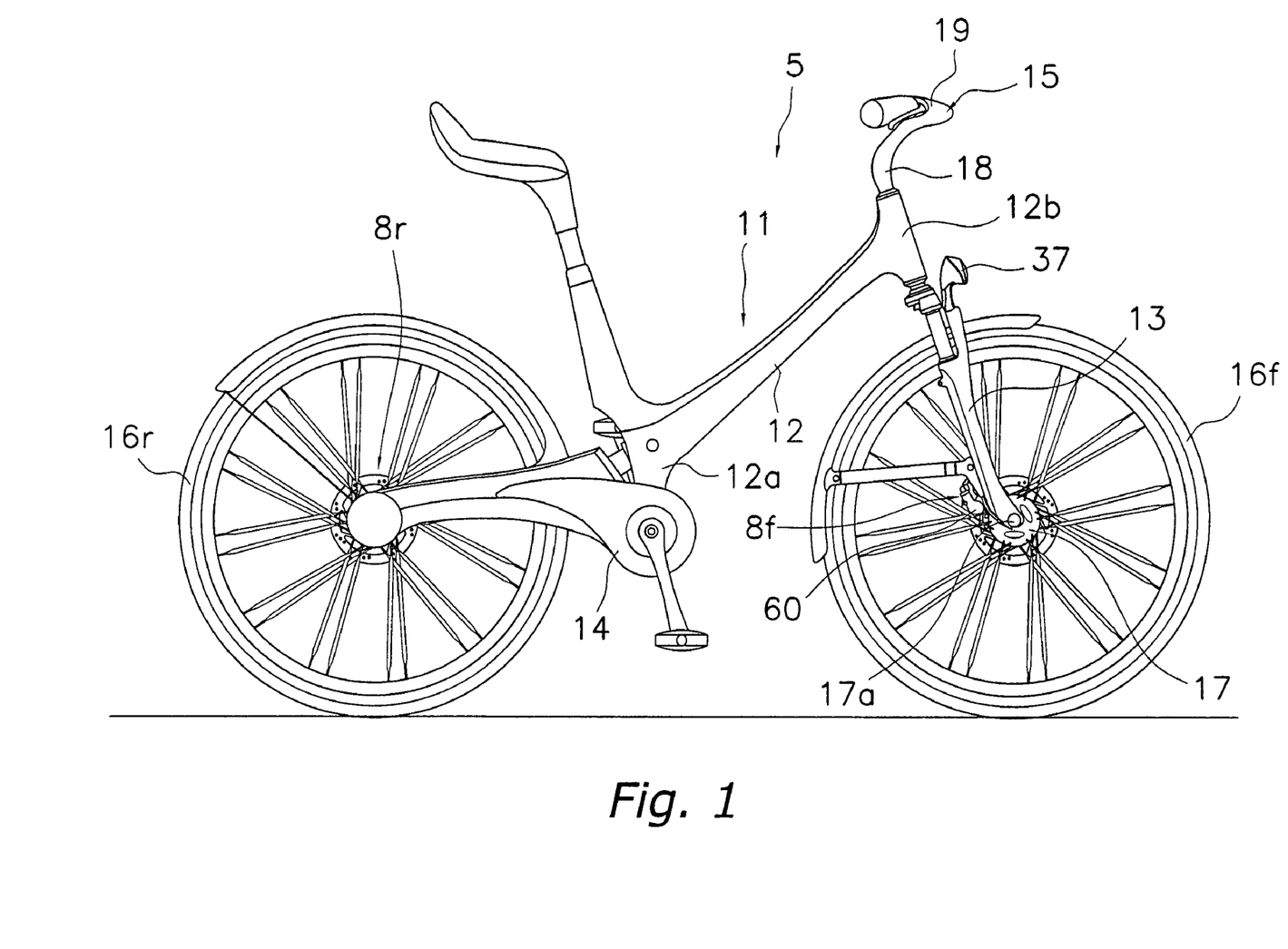
FIG. 1 is a side elevational view of a bicycle, which incorporates a bicycle suspension fork assembly in accordance with one embodiment of the present invention.

Referring initially to FIG. 1, a bicycle 5 in which one embodiment of the present invention is applied has a frame body 12 that is bent in a letter 'V' shape as well as a frame 11 having a bicycle suspension fork assembly 13 comprising one embodiment of the present invention. The bicycle 5 also has a drive unit 14 movably mounted to the bottom part of the frame body 12, a front wheel 16f mounted to the ends of the bicycle suspension fork assembly 13, a rear wheel 16r mounted to the rear end of the drive unit 14 and a handle unit 15 connected on top of the bicycle suspension fork assembly 13. The bicycle 5 also has front and rear disk brake devices 8f, 8r, a generator hub 17 on a hub shaft 17a and the handle unit 15. The generator hub 17 is mounted in the center of the front wheel 16f, and the hub shaft 17a thereof is detachably secured to the bottom ends of the bicycle suspension fork assembly 13. The handle unit 15 has a handle stem 18 that is mounted to the bicycle suspension fork assembly 13 and a handlebar 19 that is secured to the handle stem 18. The frame body 12 has a head tube 12b and a hanger unit 12a that protrudes downward from a bent area of the frame body 12. The drive unit 14, having a suspension function, is mounted to the hanger unit 12a.

As used herein to describe the present invention, the following directional terms "front, forward, rear, rearward, above, up, downward, down, vertical, horizontal, below, right and left and transverse" as well as any other similar directional terms refer to those directions of a bicycle equipped with the present invention and based on the perspective of the rider of the bicycle. Accordingly, these terms, as utilized to describe the present invention should be interpreted relative to a bicycle equipped with the present invention and from a viewpoint behind the bicycle.

Figure 2:
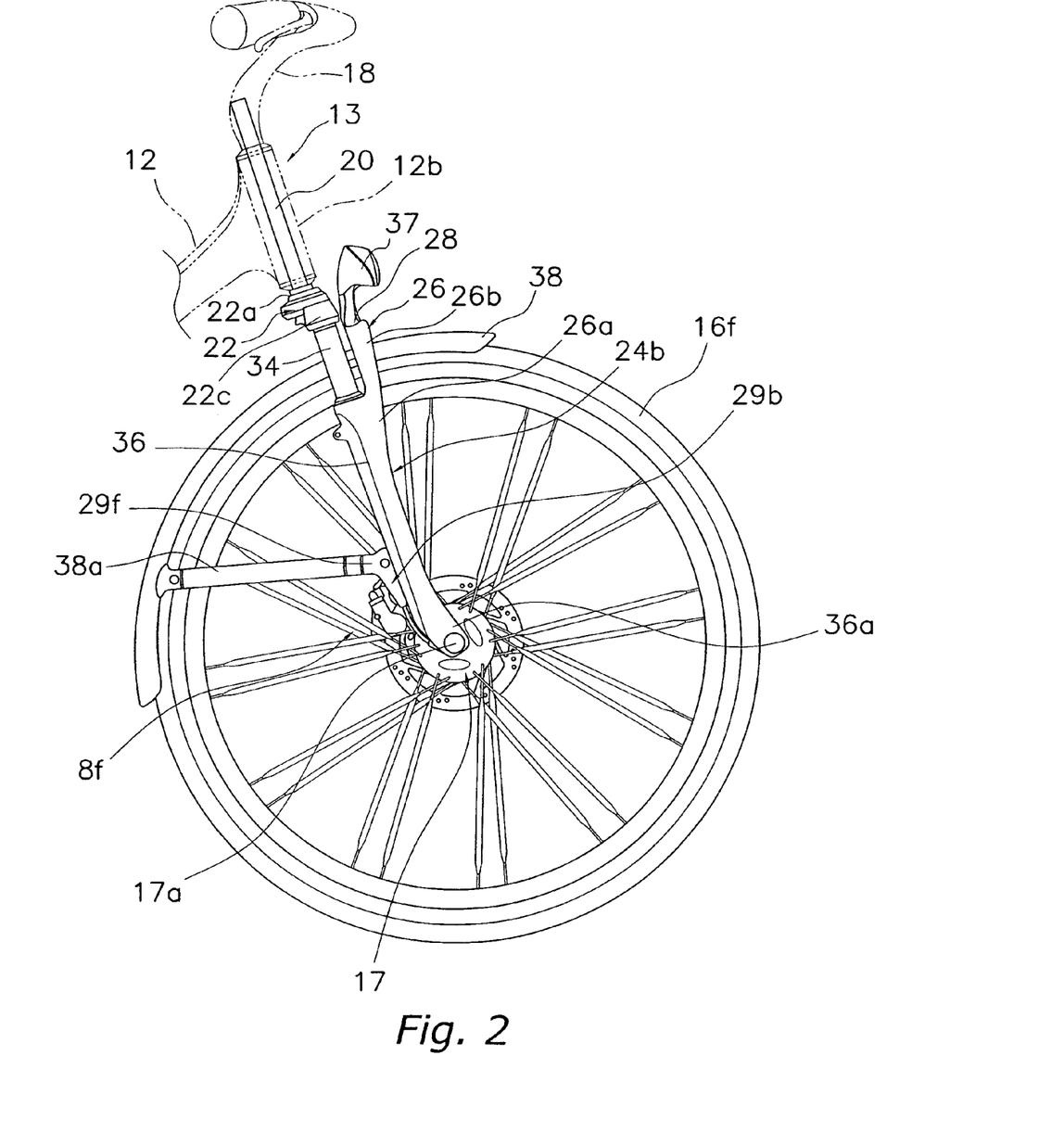
FIG. 2 is a side elevational view of the bicycle suspension fork assembly illustrated in FIG. 1 in accordance with one embodiment of the present invention.
Figure 4:
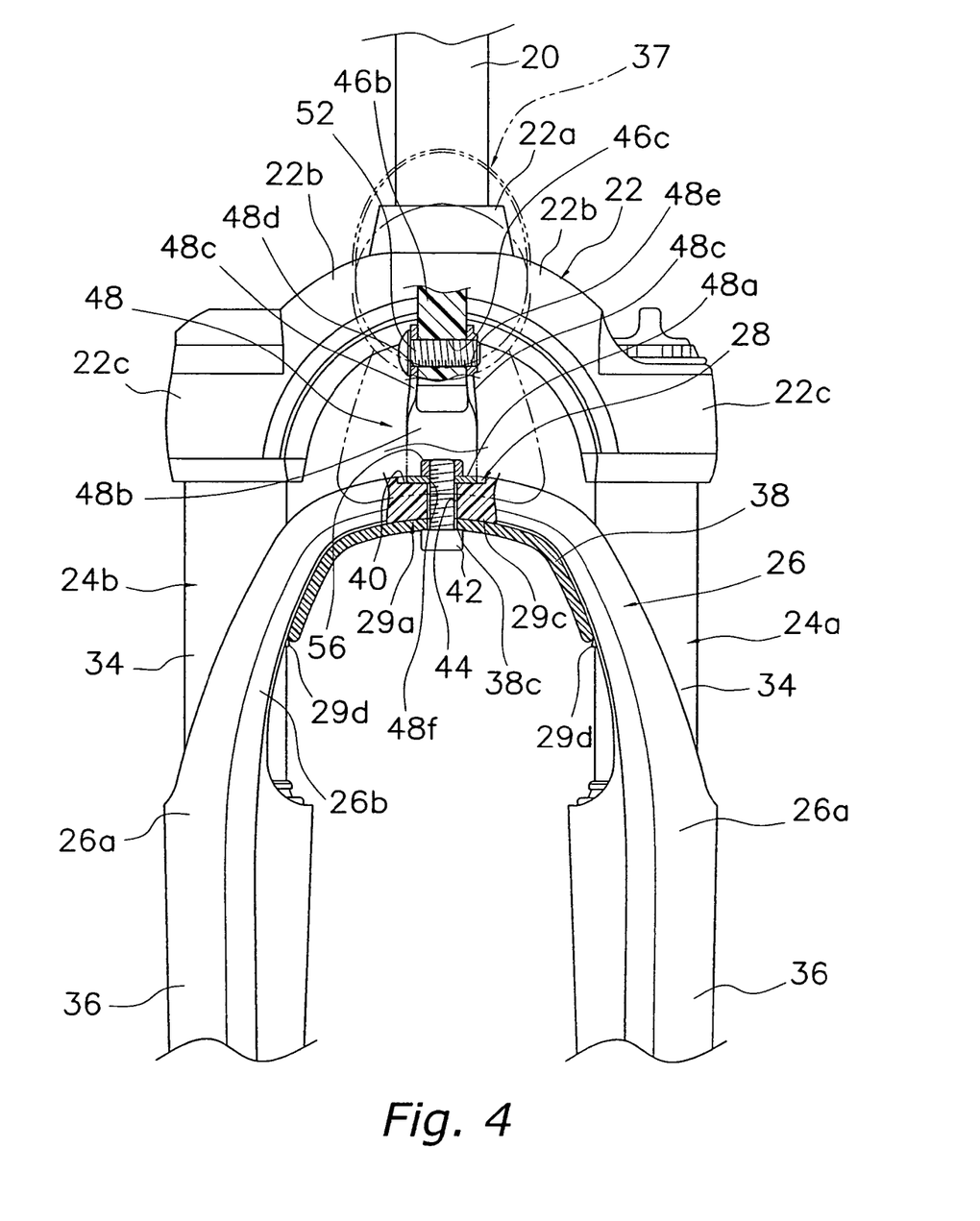
FIG. 4 is an enlarged partial front cross-sectional view of the bicycle suspension fork assembly illustrated in FIGS. 1–3 in accordance with one embodiment of the present invention.

The suspension fork 13 is rotatably mounted to the head tube 12b in the front part of the frame body 12, as shown in FIGS. 2 and 4, and is used to steer the front wheel 16f. The bicycle suspension fork assembly 13 is an upright-type, and is mounted to the head tube 12b such that it can rotate around an angled axis. The handle stem 18 is connected to the top of the bicycle suspension fork assembly 13, and the hub shaft 17a of the front wheel 16f is mounted to the bottom thereof. The bicycle suspension fork assembly 13 has a fork column 20 that is rotatably mounted to the head tube 12b, a fork shoulder unit 22 that is secured to the bottom end of the fork column 20, suspension assemblies 24a and 24b that are secured to either end of the fork shoulder unit 22, a connector 26 that connects the suspension assemblies 24a and 24b, a lamp mounting unit or an illumination device mounting unit 28 for mounting a front lamp or an illumination device 37, and first and second mud guard mounting units 29a, 29b for mounting a mud guard 38.

The fork column 20 comprises a metal pipe member, for example, and is rotatably supported by the head tube 12b. The handle stem 18 is secured to the top end of the fork column 20. The bottom end of the fork column 20 is inserted in the center of the fork shoulder unit 22 and is secured therein using an appropriate means such as press fitting, screw fitting or welding.

The fork shoulder unit 22 comprises a metal molded member, for example, and has in the center thereof a cylindrical column securing unit 22a to which the fork column 20 is mounted. The fork shoulder unit 22 also has a pair of arms 22b that extend laterally in either direction from the column securing unit 22a while curving downward, as well as a pair of cylindrical suspension mounting units 22c that are formed at the ends of the arms 22b.

The suspension assemblies 24a and 24b each have a rod 34 that is secured to one of the suspension mounting units 22c disposed at either end of the fork shoulder unit 22, and a cylinder 36 in which the rod 34 is housed such that it can axially move therein. Each cylinder 36 has a dampening mechanism (not shown) comprising a hydraulic system, pneumatic system, coil spring or rubber, or a combination thereof disposed between the rod 34 and the cylinder 36. The dampening mechanism is of a conventional type and will not be detailed herein.

The rods 34 comprise metal pipe members, the surfaces of which are plated with nickel chrome, for example. The rods 34 are secured to the suspension mounting units 22c at the top ends thereof using bolts, for example. The lower parts of the rods 34 are inserted in the cylinders 36 such that they can move axially therein while being supported by the cylinders 36.

The cylinders 36 each comprise a cylindrical member having an opening at the top end thereof, and also have a front claw 36a by which to secure the hub shaft 17a of the front wheel 16f at the bottom end of the cylinder 36. The connector 26 is integrally formed at the front part of the top end of each cylinder 36. A caliper mounting unit (not shown) by which to mount the brake caliper 60 of the front disk brake apparatus 8f is disposed on the cylinder 36 belonging to the left suspension assembly 24a.

It will be apparent to one of skill in the art that it is also acceptable if the connector 26 comprises a separate member and is secured to the cylinders 36 using bolts or the like, for example. In addition, a brake seat of the brake caliper 60 can be mounted to the connector 26.

The connector or brace 26 of the bicycle suspension fork assembly 13 connects and reinforces the cylinders 36 of the suspension assemblies 24a and 24b. The connector 26 further reinforces the bicycle suspension fork assembly 13. The connector 26 has a pair of securing units 26a each disposed on one of the cylinders 36 and a bridge 26b that connects the securing units 26a. The bridge 26b is formed such that it is curved in an arch-like horseshoe configuration in order to connect the cylinders 36 in front of the rods 34 while avoiding contact with the front wheel 16f.

Figure 3:
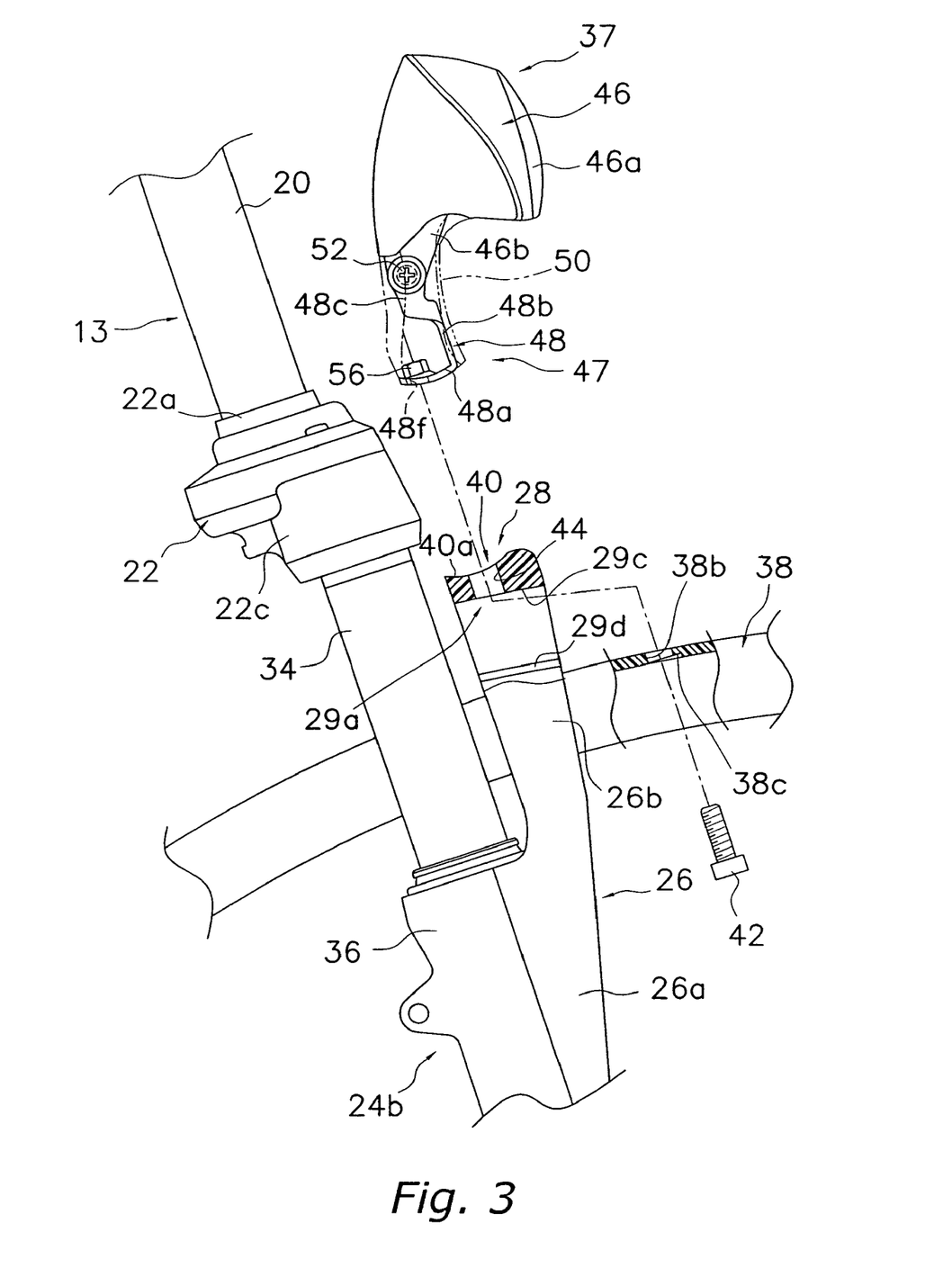
FIG. 3 is an enlarged partial side cross-sectional view of the bicycle suspension fork assembly illustrated in FIGS. 1 and 2 in accordance with one embodiment of the present invention.

The lamp mounting unit 28 is disposed on the top center surface of the connector 26, as shown in FIGS. 3 and 4. The lamp mounting unit 28 is located essentially in the lateral center of the bicycle 5. The lamp mounting unit 28 has a concave mounting area 40 that forms a depression in the center of the lamp mounting unit 28. However, while the lamp mounting unit 28 comprised a concave mounting area in the embodiment described above, it will be apparent to one of skill in the art that the lamp mounting unit 28 may comprise a protrusion.

The bicycle suspension fork assembly 13 further includes the front lamp 37 and the mud guard 38. The concave mounting area 40 has an arc-shaped curved surface 40a to which the front lamp 37 can be mounted such that it can move around a lateral axis of the concave mounting area 40. In other words, the arc shaped curved surface 40a is configured and arranged to change a vertical position of beam of light from the front lamp 37 when the front lamp 37 is mounted on the concave mounting area 40. The curved surface 40a is curved so as to be recessed downward.

A bolt through-hole 44 in which a securing bolt 42 is inserted in order to mount the front lamp 37 is formed in the lamp mounting unit 28 such that it runs vertically through the connector 26. The bolt through-hole 44 has some allowance relative to the bolt 42 for the vertical adjustment of the optical axis of the front lamp 37. Specifically, the bolt thorough-hole 44 is formed in a configuration that is slightly oval from front to back rather than in a perfect circle. This bolt through-hole 44 is preferably formed such that the opening thereof is positioned in the concave mounting area 40. Such a construction enables the securing bolt 42 to be hidden from external view and improves the design of the area around the connector 26.

Referring now to FIGS. 2–4, the first and second mud guard mounting units 29a, 29b of the bicycle suspension fork assembly 13 will now be discussed. The first mud guard mounting unit 29a is disposed on the bottom center surface of the connector 26 that faces the lamp mounting unit 28. The first mud guard mounting unit 29a includes a curved mounting surface 29c and protrusions 29d. The curved mounting surface 29c is formed in the first mud guard mounting unit 29a such that it engages with the curved top surface of the mud guard 38. In addition, the protrusions 29d that can provisionally position the mud guard 38 in a flexible fashion are formed on either or both sides of the first mud guard mounting unit 29a.

The second mud guard mounting units 29b are integrally formed on the rear surfaces of the cylinders 36. The second mud guard mounting units 29b each have a stay mounting unit 29f by which to secure the mud guard stay 38a.

Figure 5:
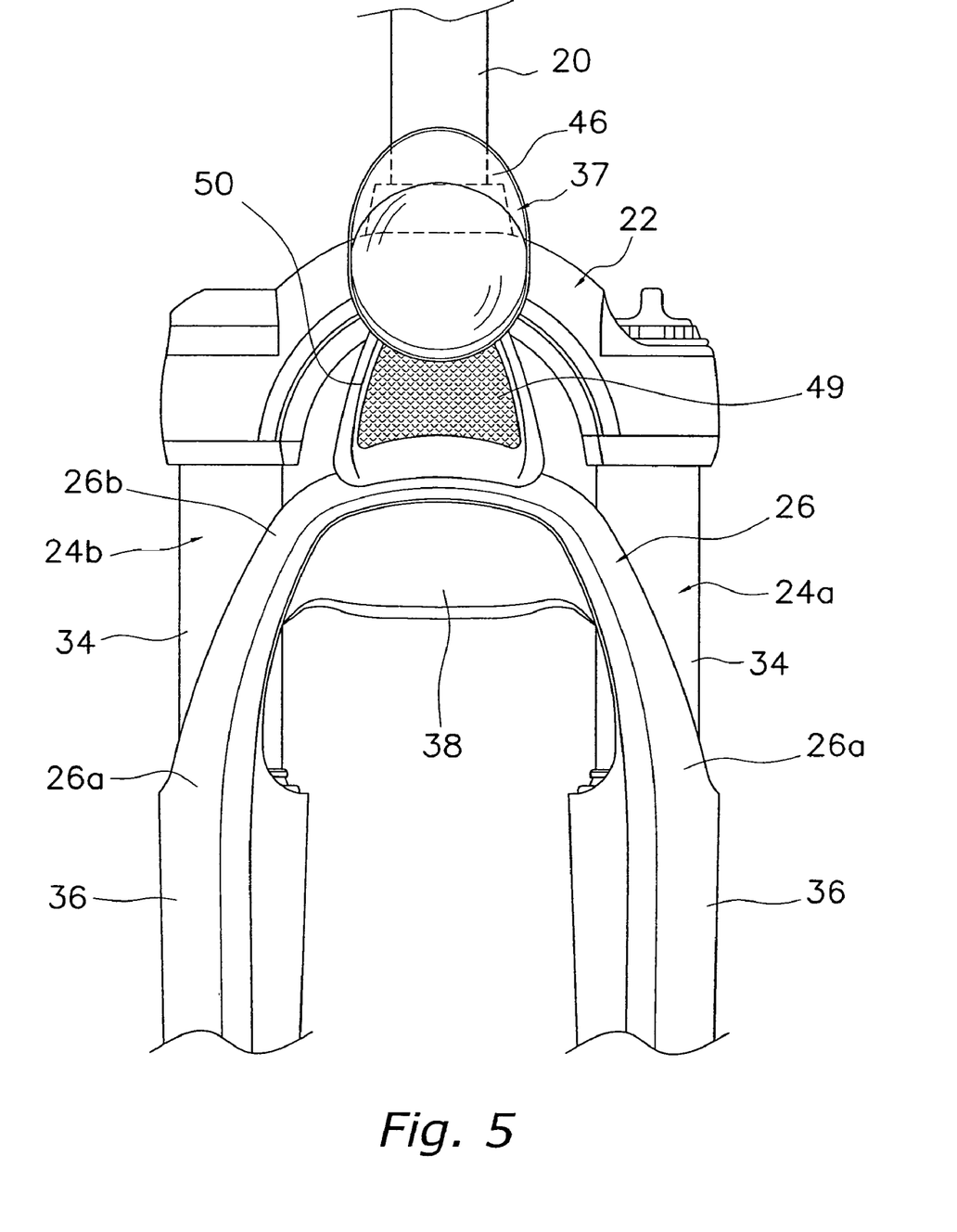
FIG. 5 is a front elevational view of the bicycle suspension fork assembly illustrated in FIGS. 1–4 in accordance with one embodiment of the present invention.

The front lamp 37 for mounting to the lamp mounting unit 28 operates using the electric power from the generator hub 17 or a built-in battery, for example. As shown in FIGS. 3–5, the front lamp 37 has a lamp unit 46 that houses a light-emitting element such as a light bulb or LED and a mounting unit 47 by which to mount the lamp unit 46 to the lamp mounting unit 28. The front lamp 37 includes a detachable cover member 50 that covers the mounting unit 47, a clear lens 46a, a crevice unit 46b and a through-hole 46c. The clear lens 46a is mounted to the front of the lamp unit 46. A crevice unit 46b for mounting a bracket 48 of the mounting unit 47 is formed behind the lamp unit 46. A through-hole 46c through which is inserted a mounting bolt 52 is formed in the crevice unit 46b. The mounting unit 47 has a bracket 48 to which the lamp unit 46 is mounted such that it can move around the lateral axis thereof.

The bracket 48 of the mounting unit 47 is formed by press-molding a metal plate, for example. The bracket 48 includes a mounting unit 48a having an arc-shaped member configured such that it travels along the curved surface 40a of the concave mounting area 40 of the lamp mounting unit 28. The bracket 48 further includes a standing unit 48b that extends upward from the mounting unit 48a, and a pair of right and left fork end units 48c that extend rearward from either end of the top end of the standing unit 48b. There is a gap between the fork end units 48c in which the crevice unit 46b of the lamp unit 46 can be grasped. The bracket 48 also has a mounting hole 48d, a nut unit 48e and a through-hole 48f. The mounting hole 48d through which the mounting bolt 52 can be inserted is formed on one fork end unit 48c (the left one in FIG. 4), while the nut unit 48e with which the mounting bolt 52 engages is formed on the other fork end unit 48c (the right one in FIG. 4). The through-hole 48f through which the securing bolt 42 is inserted is formed in the mounting unit 48a. A nut 56, which engages the securing bolt 42, is secured on the top surface of the mounting unit 48a such that it is coaxial with the through-hole 48f.

The cover member 50 of the front lamp 37 contains a space in which the bracket 48 of the mounting unit 47 can be housed. The cover member 50 can be split laterally, such that it can cover the bracket 48 after the bracket 48 is mounted to the lamp mounting unit 28. The cover member 50 includes a white reflector plate 49 that is mounted to the front surface of the cover member 50.

It will be apparent to one of skill in the art that rather than providing the concave mounting area 40 of the lamp mounting unit 28, which includes the arc-shaped curved surface 40a in order to enable vertical adjustment of the optical axis around the lateral axis of the front lamp 37, the optical adjustment need not occur using the lamp mounting unit 28. For example, in the above embodiment, the bracket 48 may be designed to permit optical axis adjustment of the bracket 48 on the mounting unit 28. In this case, a gap that can absorb the optical axis adjustment may be disposed between the cover member 50 and the lamp unit 46.

The mud guard 38 is disposed around the front wheel 16f with a slight gap therebetween such that it covers the front wheel 16f, as shown in FIGS. 2–4. The mud guard 38 is a member made of synthetic resin, for example, and has mud guard stays 38a that extend toward the second mud guard mounting units 29b of the bicycle suspension fork assembly 13. The mud guard 38 is mounted to the bicycle suspension fork assembly 13 via the first and second mud guard mounting units 29a, 29b. A through-hole 38b through which the securing bolt 42 is inserted is formed in the mud guard 38 at a position facing the first mud guard mounting unit 29a. In addition, a sunken seat area 38c in which the head of the securing bolt 42 is housed is formed around the through-hole 38b.

Figure 6:
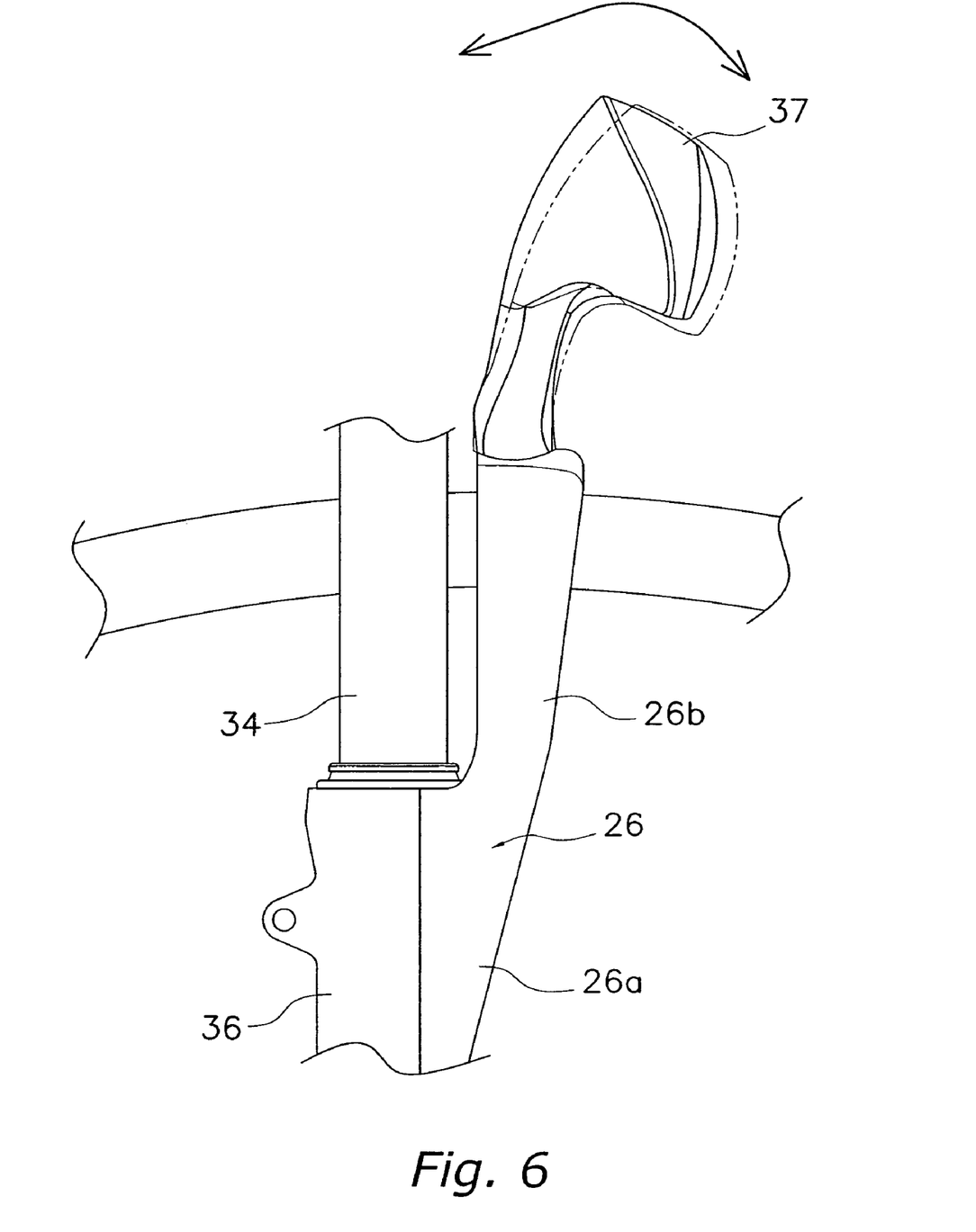
FIG. 6 is an enlarged side elevational view showing the manner in which optical axis adjustment is performed for the bicycle suspension fork assembly illustrated in FIGS. 1–5.

In a bicycle having this construction, when the front lamp 37 is to be mounted, while the front wheel 16f is removed, the mud guard 38 is provisionally mounted to the first mud guard mounting unit 29a using the protrusions 29d. The front lamp 37 is then placed on the lamp mounting unit 28, as shown in FIG. 3. The securing bolt 42 is then inserted from the bottom surface of the mud guard and screwed into the nut 56. The securing bolt 42 is provisionally tightened to the nut 56, and after adjustment of the optical axis around the lateral axis of the front lamp 37 as shown in FIG. 6, the securing bolt 42 is further tightened. Finally, the cover member 50 is placed around the bracket 48, whereupon the mounting of the front lamp 37 is completed.

In this embodiment, because the lamp mounting unit 28 is disposed on the connector 26 of the bicycle suspension fork assembly 13, an illumination device such as the front lamp 37 can be easily mounted around the suspension fork 13 without an increase in the number of component parts. Furthermore, because the front lamp 37 and mud guard 38 can be mounted simultaneously, mounting thereof is easy. In addition, because the mud guard 38 moves up and down together with the connector 26, the distance between the mud guard 38 and the front wheel 16f stays constant at all times, and the splashing of muddy water or the like can be more effectively controlled even if the cylinders 36 of the suspension fork 13 move up and down.

Moreover, as described above, because the purpose of the connector 26 is to connect and reinforce the suspension assemblies 24a and 24b, the connector 26 is formed with a relatively high rigidity. Therefore, the construction in which an illumination device, such as the front lamp 37, can be directly mounted to the connector 26 with a high rigidity ensures that the optical axis of the post-adjustment illumination device is not easily affected by the vibrations that occur when the bicycle is ridden.

Second Embodiment

Figure 7:
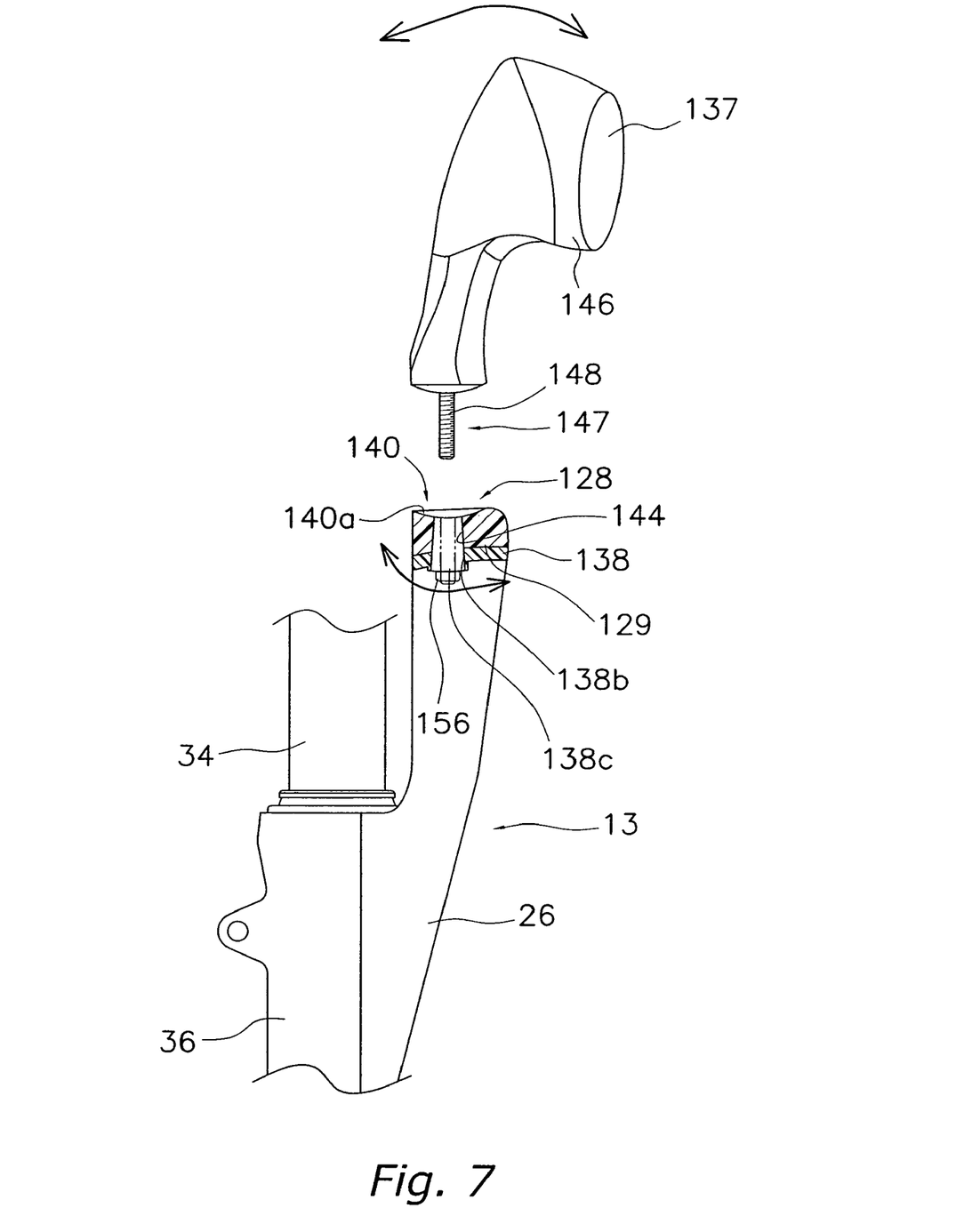
FIG. 7 is an enlarged partial side cross-sectional view of a bicycle suspension fork assembly for use with the bicycle of FIG. 1 in accordance with a second embodiment of the present invention.

Referring now to FIG. 7, a lamp mounting unit 128 and a lamp unit 146 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The lamp mounting unit 128 is essentially the same as in the first embodiment except that the concave mounting area 140 of the lamp mounting unit 128 comprises a hemispherical recess 140a. The lamp unit 146 is essentially the same as in the first embodiment except that the lamp unit 146 of the front lamp 137 is integrally formed including a part similar to the cover member 50 of the previous embodiment. The mounting unit 147 comprises a screw member 148 secured to the lamp unit 146. The bolt through-hole 144 is formed in the concave mounting area 140 such that it widens gradually along the front-back direction as it travels downward. The width of the through-hole 144 along the lateral direction remains constant. A through-hole 138b through which a screw member 148 is inserted is formed in the mud guard 138 at a position facing the first mud guard mounting unit 129a. A round protrusion 138c to facilitate the screwing of the nut 156 that engages with the screw member 148 is formed around the through-hole 138b. In this embodiment, optical axis adjustment can be performed not only around the lateral axis of the front lamp 137 but also around the vertical axis thereof. In other words, the hemispherical recess 140*a* is configured and arranged to change horizontal and vertical positions of beam of light from the front lamp 137 when the front lamp 137 is mounted on the concave mounting area 140.

While the lamp mounting unit 128 comprised a concave mounting area 140*a* in the embodiment described above, it will be apparent to one of skill in the art that the lamp mounting unit 128 may comprise a protrusion.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle suspension fork assembly comprising:
   a fork column configured and arranged to be rotatably mounted to a front part of a frame of a bicycle;
   a fork shoulder unit having a center portion with a bottom end of the fork column secured thereto and having first and second arms extending laterally in opposite directions from the center portion;
   first and second suspension assemblies secured to end portions of the first and second arms of the fork shoulder unit, respectively;
   an arch shaped connector configured and dimensioned to connect the first and second suspension assemblies; and
   an illumination device mounting unit disposed on a top surface of the connector for mounting an illumination device and having a concave mounting area across a cross-sectional width of the illumination device mounting unit.

2. The bicycle suspension fork assembly according to claim 1, wherein
   each of the first and second suspension assemblies includes a rod member that is secured to the fork shoulder unit and a cylinder member in which the rod member is housed such that the rod member can move axially therein.

3. The bicycle suspension fork assembly according to claim 2, wherein
   the connector connects the cylinder members of the first and second suspension assemblies.

4. The bicycle suspension fork assembly according to claim 3, wherein
   the connector is disposed in front of the rod members of the first and second suspension assemblies when the fork column is mounted to the frame of the bicycle.

5. The bicycle suspension fork assembly according to claim 2, wherein
   the connector is integrally formed with the cylinder members of the first and second suspension assemblies.

6. The bicycle suspension fork assembly according to claim 1, wherein
   the concave mounting area is located only in a center of the illumination device mounting unit.

7. The bicycle suspension fork assembly according to claim 6, wherein
   the concave mounting area has an arc-shaped curved surface configured and arranged to change a vertical position of a beam of light from the illumination device when the illumination device is mounted on the illumination device mounting unit.

8. The bicycle suspension fork assembly according to claim 6, wherein
   the concave mounting area has a hemispherical recess configured and arranged to change horizontal and vertical positions of beam of light from the illumination device when the illumination device is mounted on the illumination device mounting unit.

9. The bicycle suspension fork assembly according to claim 1, further comprising
   a mud guard mounting unit disposed on a bottom surface of the connector.

10. The bicycle suspension fork assembly according to claim 2, further comprising
    a mud guard mounting unit disposed on a bottom surface of the connector.

11. The bicycle suspension fork assembly according to claim 5, further comprising
    a mud guard mounting unit disposed on a bottom surface of the connector.

12. The bicycle suspension fork assembly according to claim 6, further comprising
    a mud guard mounting unit disposed on a bottom surface of the connector.

13. The bicycle suspension fork assembly according to claim 7, further comprising
    a mud guard mounting unit disposed on a bottom surface of the connector.

14. The bicycle suspension fork assembly according to claim 8, further comprising
    a mud guard mounting unit disposed on a bottom surface of the connector.

* * * * *